United States Patent
Pereg et al.

(10) Patent No.: US 9,015,046 B2
(45) Date of Patent: Apr. 21, 2015

(54) METHODS AND APPARATUS FOR REAL-TIME INTERACTION ANALYSIS IN CALL CENTERS

(75) Inventors: Oren Pereg, Zikhron Ya'akov (IL); Moshe Wasserblat, Maccabim (IL); Yuval Lubowich, Ra'anana (IL); Ronen Laperdon, Modi'in (IL); Dori Shapira, Sde Gat (IL); Vladislav Feigin, Even-Yehuda (IL); Oz Fox-Kahana, Nes Ziona (IL)

(73) Assignee: Nice-Systems Ltd., Ra'anana (IL)

( * ) Notice: Subject to any disclaimer, the term of this patent is extended or adjusted under 35 U.S.C. 154(b) by 957 days.

(21) Appl. No.: 12/797,618

(22) Filed: Jun. 10, 2010

(65) Prior Publication Data

US 2011/0307257 A1    Dec. 15, 2011

(51) Int. Cl.
| | |
|---|---|
| G10L 15/00 | (2013.01) |
| G06Q 10/06 | (2012.01) |
| G10L 15/08 | (2006.01) |
| G10L 15/22 | (2006.01) |
| G06Q 30/00 | (2012.01) |
| G06Q 30/02 | (2012.01) |

(52) U.S. Cl.
CPC .............. *G06Q 10/063* (2013.01); *G10L 15/08* (2013.01); *G10L 15/22* (2013.01); *G10L 2015/085* (2013.01); *G10L 2015/081* (2013.01); *G06Q 30/01* (2013.01); *G06Q 30/0202* (2013.01)

(58) Field of Classification Search
CPC ......... G10L 15/00; G10L 15/08; G10L 15/19; G10L 15/26; G10L 15/265; G10L 15/22; G10L 17/00; G10L 17/005; G10L 17/22; G10L 17/26; G10L 25/00; G10L 25/03; G10L 25/27; G10L 25/48; G10L 25/51; G10L 25/54; G10L 25/63; G10L 25/66; G10L 2015/00; G10L 2015/22; G10L 2015/227; G10L 2015/226; G10L 2025/00; H04M 2201/40
USPC .................. 704/231, 246, 251, 235, 257, 254, 704/270.1; 379/88.01, 265.01–265.07
See application file for complete search history.

(56) References Cited

U.S. PATENT DOCUMENTS

| | | | | |
|---|---|---|---|---|
| 6,173,260 | B1 * | 1/2001 | Slaney ........................ | 704/250 |
| 6,185,527 | B1 * | 2/2001 | Petkovic et al. ............. | 704/231 |
| 6,219,639 | B1 * | 4/2001 | Bakis et al. .................. | 704/246 |
| 6,480,826 | B2 * | 11/2002 | Pertrushin .................... | 704/270 |

(Continued)

OTHER PUBLICATIONS

Hearst, M.A. Support Vector Machines; IEEE Intelligent Systems, vol. 13, No. 4, Jul.-Aug. 1998; pp. 18-28, doi:10.1109/5254.708428.

*Primary Examiner* — Paras D Shah
(74) *Attorney, Agent, or Firm* — Soroker-Agmon (57) ABSTRACT

A method and system for indicating in real time that an interaction is associated with a problem or issue, comprising: receiving a segment of an interaction in which a representative of the organization participates; extracting a feature from the segment; extracting a global feature associated with the interaction; aggregating the feature and the global feature; and classifying the segment or the interaction in association with the problem or issue by applying a model to the feature and the global feature. The method and system may also use features extracted from earlier segments within the interaction. The method and system can also evaluate the model based on features extracted from training interactions and manual tagging assigned to the interactions or segments thereof.

9 Claims, 7 Drawing Sheets

(56) References Cited

U.S. PATENT DOCUMENTS

| | | | |
|---|---|---|---|
| 6,542,602 B1 * | 4/2003 | Elazar | 379/265.06 |
| 6,574,595 B1 * | 6/2003 | Mitchell et al. | 704/242 |
| 6,922,466 B1 * | 7/2005 | Peterson et al. | 379/88.09 |
| 7,624,012 B2 * | 11/2009 | Pachet et al. | 704/249 |
| 7,729,914 B2 * | 6/2010 | Tato et al. | 704/270 |
| 7,752,043 B2 * | 7/2010 | Watson | 704/235 |
| 7,801,055 B1 * | 9/2010 | Blair | 370/252 |
| 7,801,280 B2 * | 9/2010 | Conway | 379/1.03 |
| 7,940,914 B2 * | 5/2011 | Petrushin | 379/265.06 |
| 7,983,910 B2 * | 7/2011 | Subramanian et al. | 704/250 |
| 8,140,330 B2 * | 3/2012 | Cevik et al. | 704/241 |
| 8,195,449 B2 * | 6/2012 | Bruhn et al. | 704/200.1 |
| 8,260,614 B1 * | 9/2012 | Zhao et al. | 704/243 |
| 2005/0108775 A1 * | 5/2005 | Bachar et al. | 725/135 |
| 2007/0043608 A1 * | 2/2007 | May et al. | 705/10 |
| 2007/0071206 A1 * | 3/2007 | Gainsboro et al. | 379/168 |
| 2007/0179784 A1 * | 8/2007 | Thambiratnam et al. | 704/255 |
| 2008/0040110 A1 | 2/2008 | Pereg et al. | |
| 2008/0195385 A1 * | 8/2008 | Pereg et al. | 704/231 |
| 2008/0256033 A1 * | 10/2008 | Cheng | 707/3 |
| 2009/0076811 A1 * | 3/2009 | Ofek | 704/231 |
| 2009/0164302 A1 * | 6/2009 | Jung et al. | 705/10 |
| 2009/0210226 A1 * | 8/2009 | Ma | 704/236 |
| 2011/0040554 A1 * | 2/2011 | Audhkhasi et al. | 704/9 |
| 2011/0196677 A1 * | 8/2011 | Deshmukh et al. | 704/246 |

* cited by examiner

METHODS AND APPARATUS FOR REAL-TIME INTERACTION ANALYSIS IN CALL CENTERS

TECHNICAL FIELD

The present disclosure relates to call centers in general, and to a method and apparatus for obtaining business insight from interactions in real-time, in particular.

BACKGROUND

Large organizations, such as commercial organizations, financial organizations or public safety organizations conduct numerous interactions with customers, users, suppliers or other persons on a daily basis. A large part of these interactions are vocal, or at least comprise a vocal component.

Many of the interactions proceed in a satisfactory manner. The callers receive the information or service they require, and the interaction ends successfully. However, other interactions may not proceed as expected, and some help or guidance from a supervisor may be required. In even worse scenarios, the agent or another person handling the call may not even be aware that the call is problematic and that some assistance may be helpful. In some cases, when things become clearer, it may already be too late to remedy the situation, and the customer may have already decided to leave the organization.

Similar scenarios may occur in other business interactions, such as unsatisfied customers which do not immediately leave the organization but may do so when the opportunity presents itself, sales interactions in which some help from a supervisor can make the difference between success and failure, or similar cases.

Yet another category in which immediate assistance or observation can make a difference is fraud detection, wherein if a caller is suspected to be fraudulent, then extra care should be taken to avoid operations that are lossy for the organization.

For cases such as those described above, early alert or notification can let a supervisor or another person join the interaction or take any other step, when it is still possible to provide assistance, remedy the situation, or otherwise reduce the damages. Even if immediate response is not feasible, near real-time alert, i.e., alert provided a short time after the interactions finished may also be helpful and enable some damage reduction.

There is therefore a need in the art for a method and system that will enable real-time or near-real-time alert or notification about interactions in which there is a need for intervention by a supervisor, or another remedial step to be taken. Such steps may be require for preventing customer churn, keeping customer satisfied, providing support for sales interactions, identifying fraud or fraud attempts, or any other scenario that may pose a problem to a business.

SUMMARY

A method and apparatus for classifying interactions captured in an environment according to problems or issues, in real time.

One aspect of the disclosure relates to a method for indicating in real time that an interaction in which a representative of an organization participates is associated with a problem or issue, comprising: receiving a segment of the interaction; extracting a feature from the segment; extracting a global feature associated with the interaction; aggregating the feature and the global feature; and classifying the segment or the interaction in association with the problem or issue by applying a model to the feature and the global feature. The method can further comprise determining an action to be taken when the classification indicated that the segment or interaction is associated with the problem or issue. The method can further comprise: receiving a training corpus; framing an interaction of the test corpus into segments; extracting features from the segments; and evaluating the model based on the features. Within the method, the feature optionally relates to the segment and is selected from the group consisting of: a spotted word; a feature or indication associated with emotion; an emotion score that represents the probability of emotion to exist within the segment; a talk analysis parameters; an agent burst position; a customer burst position; a number of bursts; agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment. Within the method, the global feature is optionally selected from the group consisting of: average agent activity within the interaction; average customer activity within the interaction; average silence; number of bursts per participant side; total burst duration per participant side; an emotion detection feature; total probability score for an emotion within the interaction; number of emotion bursts; total emotion burst duration; a stemmed word, a stemmed keyphrase; number of word repetitions; and number of keyphrase repetitions. Within the method, the aggregation step optionally aggregates a feature related to a second segment preceding the segment, the feature selected from the group consisting of: a spotted word; a feature or indication associated with emotion; an emotion score that represents the probability of emotion to exist within the segment; a talk analysis parameters; an agent burst position; a customer burst position; a number of bursts; agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment. Within the method, the action is optionally selected from the group consisting of: popping a message on a display device used by a person; generating an alert; routing the interaction; conferencing the interaction; and adding data to a statistical storage. Within the method, the problem or issues is selected from the group consisting of: customer dissatisfaction; churn prediction; sales assistance; and fraud detection. Within the method, the feature is optionally a word spoken in the segment or interaction, the method comprising: generating a phoneme graph from the segment or interaction, and flushing a part of the graph so as to enable for searching a word within the graph. Within the method, the segment of the interaction optionally overlaps with a previous or following segment of the interaction. The method can further comprise fast search of the part of the graph.

Another aspect of the disclosure relates to a system for indicating in real time that an interaction in which a representative of an organization participates is associated with a problem or issue, comprising: an extraction component for extracting a feature from a segment of an interaction in which a representative of the organization participates; an interaction feature extraction component for extracting a global feature from the interaction; and a classification component for determining by applying a model to the feature and the global feature whether a problem or issue associated are presented by the segment or interaction. The apparatus can further comprise an action determination component for determining an action to be taken after determining that the problem or issue associated are presented by the segment or interaction. The apparatus can further comprise an application component for taking an action upon determining that the problem or issue associated is presented by the segment or interaction. The apparatus can further comprise a model evaluation component for evaluating the model used by the classification component. The apparatus can further comprise a tagging component for assigning tags associated with the problem or issue to interactions or segments. Within the apparatus, the feature optionally relates to the segment and is selected from the group consisting of: a spotted word; a feature or indication associated with emotion; an emotion score that represents the probability of emotion to exist within the segment; a talk analysis parameters; an agent burst position; a customer burst position; a number of bursts; agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment. Within the apparatus, the global feature is optionally selected from the group consisting of: average agent activity within the interaction; average customer activity within the interaction; average silence; number of bursts per participant side; total burst duration per participant side; an emotion detection feature; total probability score for an emotion within the interaction; number of emotion bursts; total emotion burst duration; a stemmed word, a stemmed keyphrase; number of word repetitions; and number of keyphrase repetitions. Within the apparatus, the classification component optionally uses also a feature extracted from a second segment within the interaction, the feature selected from the group consisting of: a spotted word; a feature or indication associated with emotion; an emotion score that represents the probability of emotion to exist within the segment; a talk analysis parameters; an agent burst position; a customer burst position; a number of bursts; agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment.

Yet another aspect of the disclosure relates to a computer readable storage medium containing a set of instructions for a general purpose computer, the set of instructions comprising: receiving a segment of an interaction in which a representative of the organization participates; extracting a feature from the segment; extracting a global feature associated with the interaction; aggregating the feature and the global feature; and classifying the segment or the interaction in association with the problem or issue by applying a model to the feature and the global feature.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

A method and apparatus for identifying in real-time interactions in a call center, a trade floor, a public safety organization, the interactions requiring additional attention, routing, or other handling. Identifying such as interaction in real-time relates to identifying that the interaction requires special handling while the interaction is still going on, or a short time after it ends, so that such handling is efficient.

The method and apparatus are based on extracting multiple types of information from the interaction while it is progressing. A feature vector is extracted from the interaction for example every predetermined time frame, such as a number of seconds. In some embodiments, a feature vector extracted during an interaction can also contain or otherwise relate to features extracted at earlier points of time during the interaction, i.e., the feature vector can carry some of the history of the interaction.

The features may include textual features, such as phonetic indexing or speech-to-text (S2T) output, comprising words detected within the audio of the interaction; acoustical or prosody features extracted from the interaction, emotion detected within the interaction, CTI data, CRM data, talk analysis information, or the like.

The method and apparatus employ a training step and training engine. During training, vectors of features extracted from training interactions are associated with tagging data. The tagging can contain an indication of a problem the organization wishes to relate to, for example "customer dissatisfaction", "predicted churn", "sales assistance required", "fraud detected", or the like. The tagging data can be created manually or in any other manner, and can relate to a particular point of time in the interaction, or to the interaction as a whole.

By processing the set of pairs, wherein each pair comprises the feature vector and one or more associated tags, a model is estimated which provides association of feature vectors with tags.

Then at production time, also referred to as testing, runtime, or realtime, features are extracted from an ongoing interaction, and based on the model or rule deduced during training, real-time indications are determined for the interaction. The indications can be used in any required manner. For example, the indication can cause a popup message to be displayed on a display device used by a user, the message can also comprise a link through which the supervisor can join the interaction. In another embodiment, the indication can be used for routing the interaction to another destination, used for statistics, or the like.

The models, and optionally the features extracted from the interactions are stored, and can be used for visualization, statistics, further analysis of the interactions, or any other purpose.

The extraction of features to be used for providing real-time indications is adapted to efficiently provide results based on the latest feature vector extracted from the interaction, and on previously extracted feature vectors, so that the total indication is provided as early as possible, and preferably when the interaction is still going on.

Figure 1:
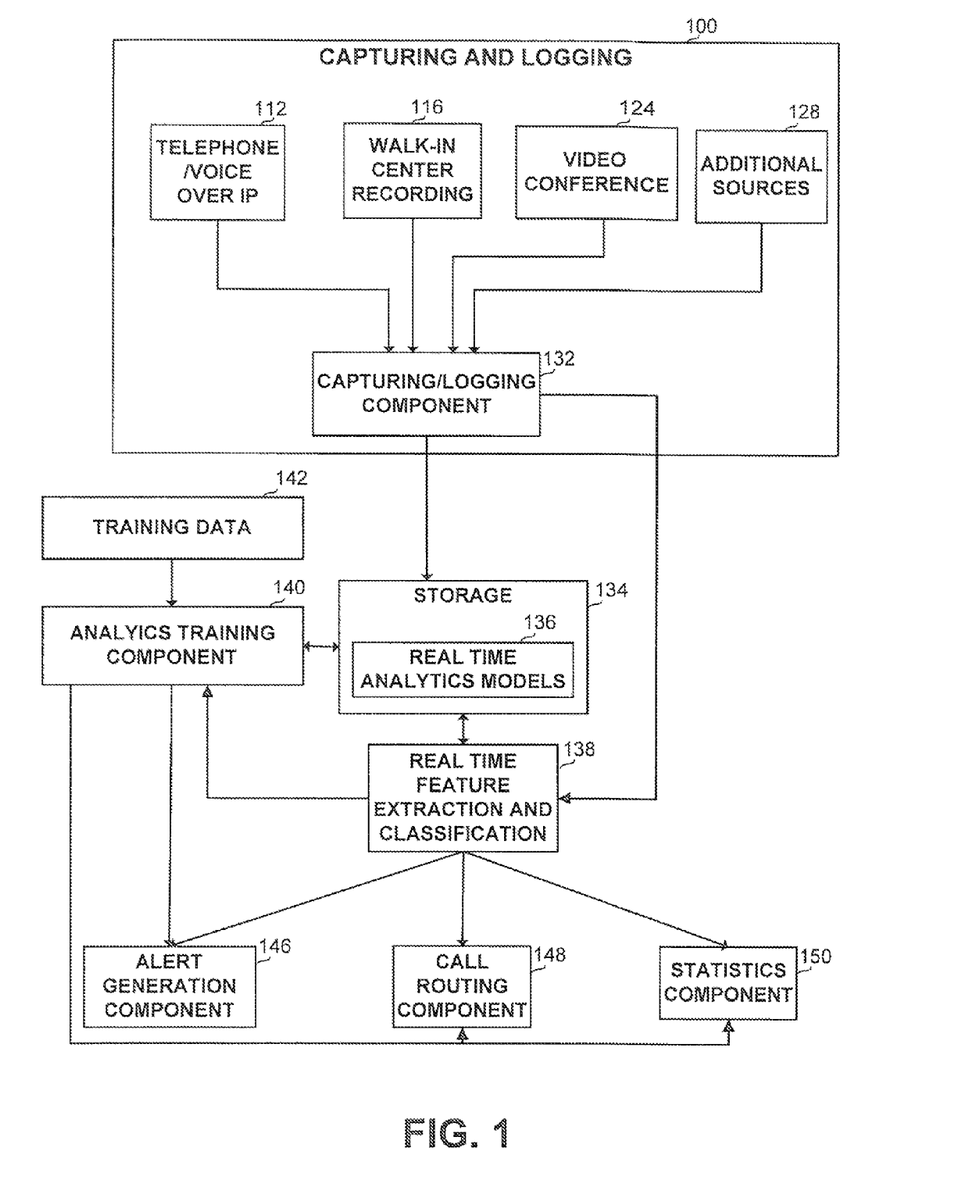
FIG. 1 is a schematic illustration of typical environment in which the disclosed invention is used.

Referring now to FIG. 1, showing a block diagram of the main components in a typical environment in which the disclosed method and apparatus are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like.

The interactions are captured using capturing or logging components 100. The vocal interactions usually include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two-sided conversations. The interactions can further include face-to-face interactions, such as those recorded in a walk-in-center 116, video conferences 124 which comprise an audio component, and additional sources of data 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others, information from Computer-Telephony-Integration (CTI) systems, information from Customer-Relationship-Management (CRM) systems, or the like.

Data from all the above-mentioned sources and others is captured and may be logged by capturing/logging component 132. Capturing/logging component 132 comprises a computing platform executing one or more computer applications as detailed below. The captured data may be stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of or storage additional to storage 134 is storage 136 that stores the real-time analytic models which are determined via training as detailed below, and used in run-time for feature extraction and classification in further interactions. Storage 134 can comprise a single storage device or a combination of multiple devices.

Real-time feature extraction and classification component 138 receives the captured or logged interactions, processes them and identifies interactions that should be noted, for example, by generating an alert, routing a call, or the like. Real-time feature extraction and classification component 138 optionally employs one or more engines, such as word spotting engines, transcription engines, emotion detection engines, or the like for processing the input interactions.

It will be appreciated that in order to provide indications related to a particular interaction as it is still going on or a short time later, classification component 138 may receive short segments of the interaction and not the full interaction when it is done. The segments can vary in length between a fraction of a second to one or a few tens of seconds. It will also be appreciated that the segments do not have to be of uniform length. Thus, at the beginning of an interaction, longer segments can be used. This may serve two purposes: first, the likelihood of a problem at the beginning of an interaction is relatively low. Second, since the beginning of the interaction can be assumed to be more neutral, it can be used as a baseline for constructing relevant models to which later parts of the interaction can be compared. Large deviation between the beginning and the continuation of the interaction can indicate a problematic interaction.

The apparatus further comprises analytics training component 140 for training models upon training data 142.

The output of real-time feature extraction and classification component 138 and optionally additional data may be sent to alert generation component 146 for alerting a user such as a supervisor in any way the user prefers, or as indicated for example by a system administrator. The alerts can include for example various graphic alerts such as a screen popup, a vocal indication, an SMS, an e-mail, a textual indication, a vocal indication, or the like. Alert generation component 146 can also comprise a mechanism for the user to automatically take action, such as connect to an ongoing call. The alert can also be presented as a dedicated user interface that provides the ability to examine and listen to relevant areas of the interaction or of previous interactions, or the like. The results can further be transferred to call routing component 148, for routing a call to an appropriate representative or another person. The results can also be transferred to statistics component 150 for collecting statistics about interactions in general, and interactions for which an alert was generated, in particular, and the reasons thereof, in particular.

The data can also be transferred to any additional usage component which may include further analysis, for example performing root cause analysis. Additional usage components may also include playback components, report generation components, or others. The real-time classification results can be further fed back and update the real-time analytic models generated by analytic training component 140.

The apparatus may comprise one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
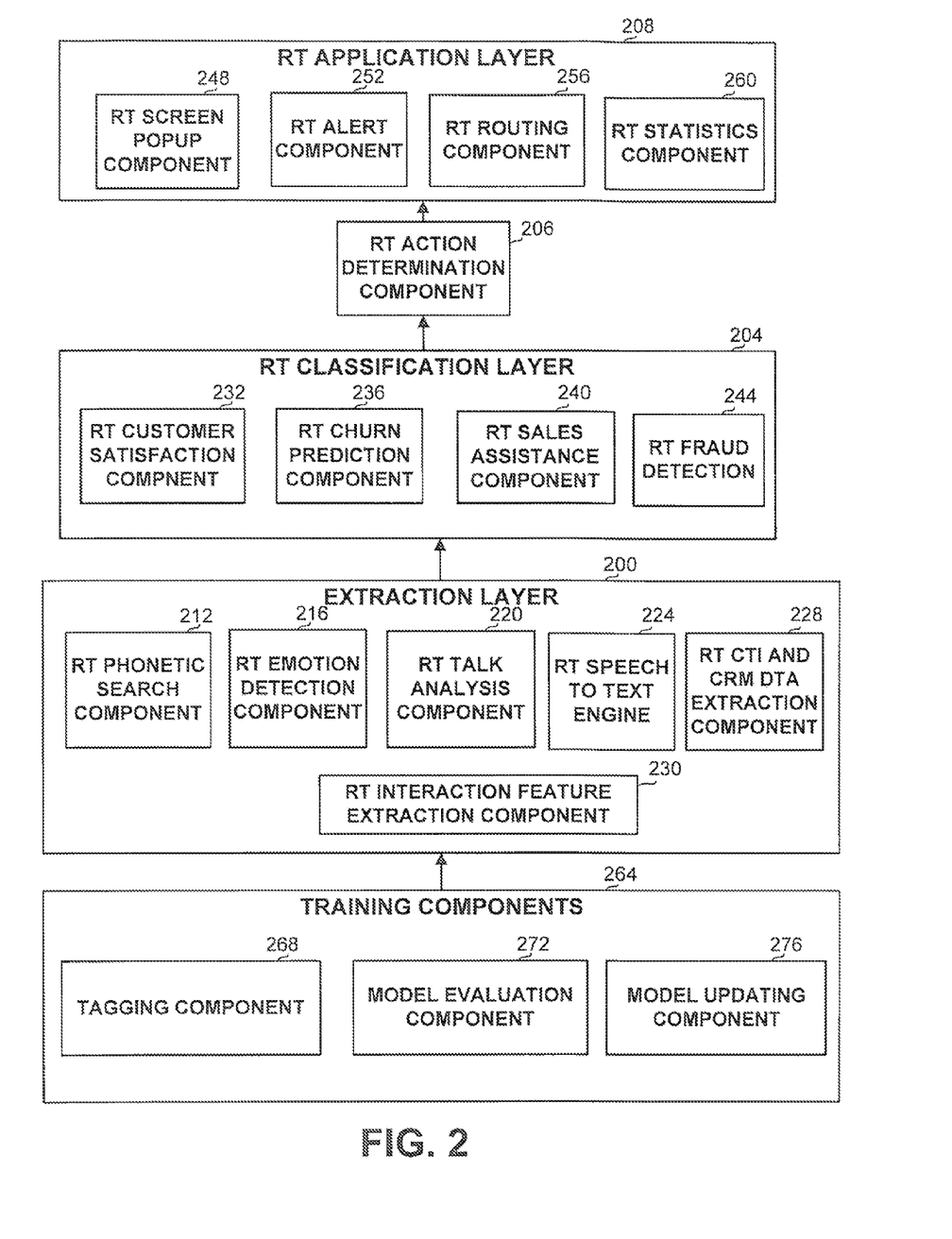
FIG. 2 is a schematic illustration of a block diagram of a system for early notification, in accordance with a preferred implementation of the disclosure.

Referring now to FIG. 2, showing a block diagram of the main components in a system for real time analytics.

The system comprises four main layers, each comprising multiple components: extraction layer 200 for extracting features from the interactions or from additional data; real-time (RT) classification layer 204 for receiving the data extracted by extraction layer 200 and generating indications for problematic or other situations upon the extracted features; RT action determination component 206 for determining the desired action upon receiving the problem indication; and RT application layer 208 for utilizing the indications generated by RT classification layer 204 by providing alerts to sensitive interactions, enabling call routing or conferencing, or the like.

The system can further comprise training components 262 for training the models upon which classification layer 204 identifies the interaction for which an alert or other indication should be provided.

Extraction components 200 comprise RT phonetic search component 212, for phoneme-based extraction of textual data from an interaction, RT emotion detection component 216 for extracting features related to emotions expressed during the interactions, RT talk analysis component 220 for extracting features related to the interaction flow, such as silence periods vs. talk periods on either side, crosstalk events, talkover parameters, or the like.

Extraction components 200 further comprise RT speech to text engine 224 for extracting the full text spoken within the interaction so far, and RT Computer Telephony Integration (CTI) and Customer Relationship Management (CRM) data extraction component 228 for extracting data related to the interaction from external systems, such as CTI, CRM, or the like. Extraction components 200 further comprise RT interaction feature extraction component 230 for extracting features related to the interaction as a whole rather than to a single segment within the interaction.

Components of extraction components 200 are detailed in association with the following figures below.

RT classification layer 204 comprises components for utilizing the data extracted by extraction components 200 in order to identify interactions indicating business problems or business aspects which are of interest for the organization. Layer 204 can comprise, for example, RT customer satisfaction component 232 for identifying interactions or parts thereof in which a customer is dissatisfied, and some help may be required for the agent handling the interaction, RT churn prediction component 236 for identifying interactions which provide indications that the customer may churn the organization, RT sales assistance component 240 for identifying sales calls in which the representative may require help in order to complete the call successfully, and RT fraud detection component 244 for identifying calls associated with a fraud, a fraud attempt or a fraudster.

It will be appreciated that any other or different components can be used by RT classification layer 204, according to the business scenarios or problems which organization wants to identify. Such problems or scenarios may be general, domain specific, vertical specific, business specific, or the like.

The components of RT classification layer 204 use trained models which are applied to the feature vectors extracted by extraction components 200.

Figure 6:
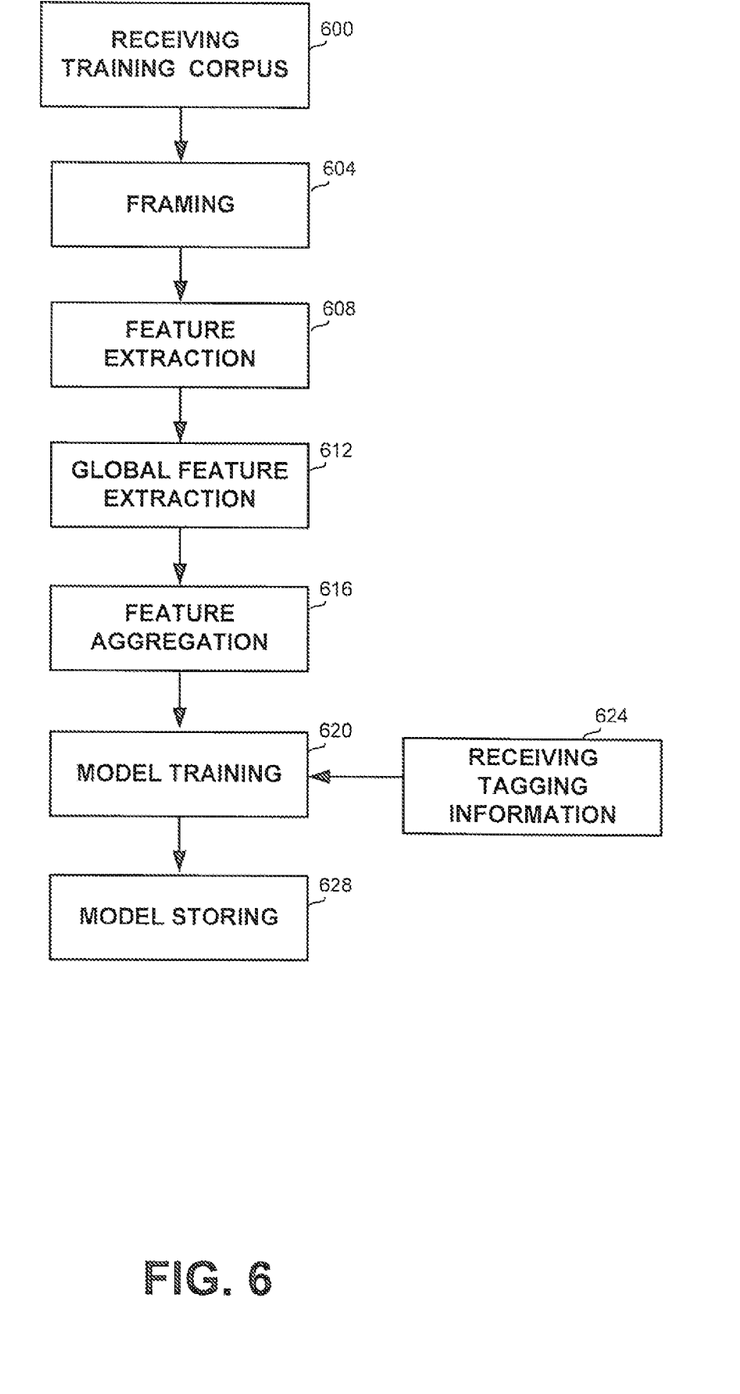
FIG. 6 is a flowchart of the main steps in a method for training a model related to a particular problem, in accordance with a preferred implementation of the disclosure.

A flowchart of an exemplary method in which any of the components of RT classification layer 204 operates is provided in association with FIG. 6 below. FIG. 6 below provides a flowchart of a method for estimating the models used by RT classification layer 204.

The system further comprises RT application layer 208, which comprises components for using the indications provided by classification layer 204. For example, RT application layer 208 can comprise RT screen popup component 248 for popping a message on a display device used by a relevant person, such as a supervisor, that an interaction is in progress for which help may be required. The message can comprise a link to be clicked, or an application which enables the viewer of the message to join the call, or automatically call the customer or the agent if the interaction has ended.

RT application layer 208 can also comprise RT alert component 252 for generating any type of alert regarding an interaction requiring extra attention. The alert can take the form of an e-mail, sort message, telephone call, fax, visual alert, vocal alert, or the like.

Yet another application can be provided by RT routing component 256 for routing or conferencing a call for which a problematic situation has been detected.

A further application can be provided by RT statistics component 260, which collects, analyzes and presents statistical data related to all interactions, to interactions for which a condition or situation has been identified by RT classification layer, or the like.

It will be appreciated by a person skilled in the art that some of the options above can be offered by a single application or module, or by multiple applications which may share components. It will also be appreciated that multiple other applications can be designed and used in order to utilize the indications provided by classification layer 204.

The various applications can be developed using any programming language and under any development environment, using any proprietary or off the shelf user interface tools.

Yet another group of components in the system is training components 264 for generating the models upon which classification is performed. Training components 264 optionally include tagging component 268, which may provide a user interface for a user to tag interactions or certain time frames or time points within interactions, in accordance with the required tags, such as "unsatisfied customer", "churning customer" or the like. Alternatively, tagging information can be received from an external source.

Training components 264 further comprise model evaluation component 272 for evaluating a model based on the received tags, and the features extracted by extraction components 200. Training components 264 can further comprise model updating component 276 for enhancing an existing model when more pairs of feature vectors and tags are available.

It will be appreciated that in order for a real time analytics system to be effective, it should analyze as many input interactions as possible. Such interactions may arrive from multiple channels. Each such channel represents independent data coming from an independent source, and should therefore be treated as such.

As detailed in association with FIG. 1 above, the audio is in digital format, either as sampled from an analog source such as a microphone, broadcast, telephone, etc., or as extracted from a digital source such as a digital extension telephone or digital broadcasting. The audio may even be extracted from a possibly lossy compressed source, such as Voice over IP (VOIP) calls such as Telephone, Skype, etc., or from a streaming media with or without a video channel.

In some embodiments, some of the engines, such as the components of extraction layer 200 of FIG. 2 are efficient enough to handle multiple channels simultaneously. In order to utilize these capabilities, multiple channels may be time-multiplexed and fed into a single engine.

For multiplexing the engines, the data collected from each channel data is divided into buffers, being audio clips of a predetermined length, such as a few seconds each. The buffers of a particular interaction are sent to the engine for analysis one by one, as they are captured. The engine "scans" the input channels, takes a buffer from each channel, and analyzes it. This arrangement keeps the independence of the channel processing, while utilizing the engine for simultaneous processing of multiple channels.

In addition, in order to avoid missing an event in cases where an event starts at a certain buffer, and continues or ends at the next buffer, subsequent buffers of the same channel overlap each other by a predetermined number of seconds ($\Delta T$). Thus, a buffer will start $\Delta t$ seconds before the preceding buffer one ended.

Figure 3:
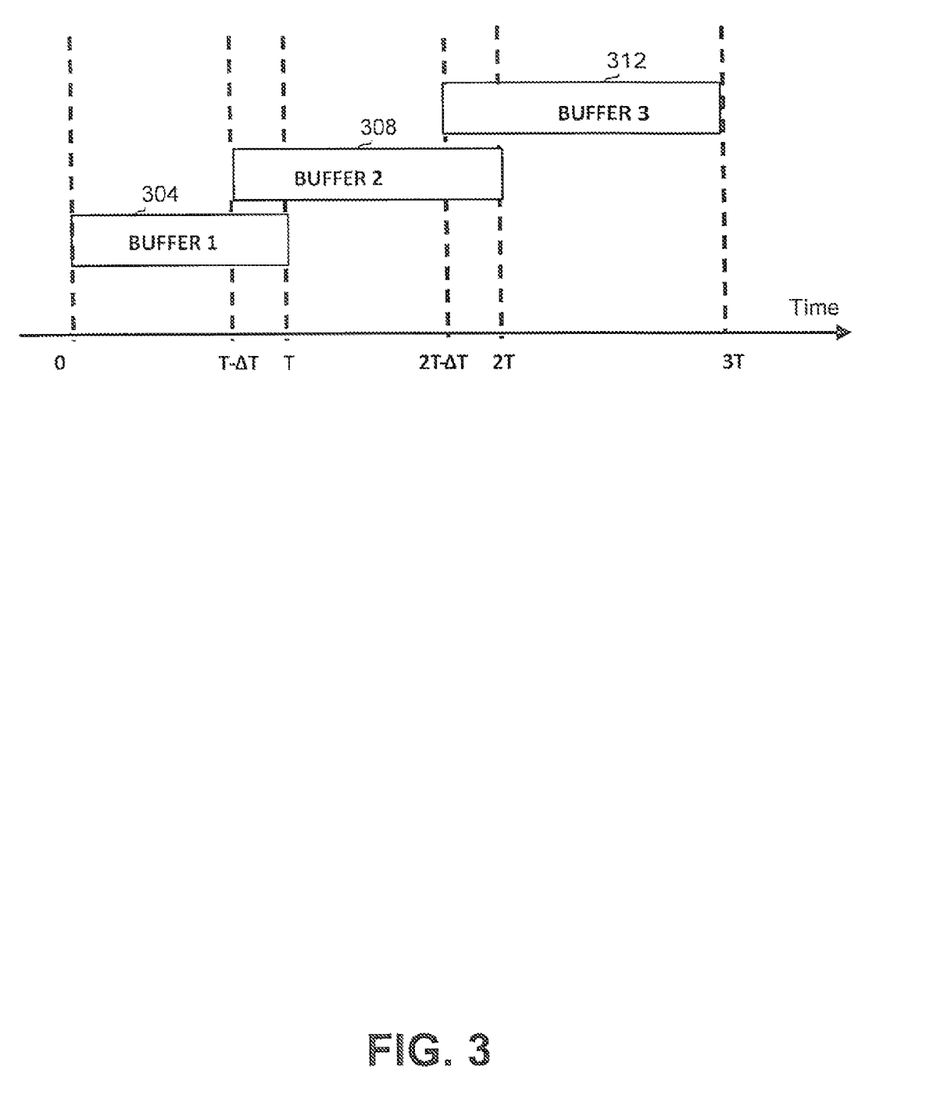
FIG. 3 is a schematic illustration of buffering an audio interaction so that multiple channels can be analyzed by one engine, in accordance with a preferred implementation of the disclosure.

Referring now to FIG. 3, showing a schematic illustration of the division of an interaction into buffers.

The interaction starts at time 0 (relative to the beginning of the interaction). Buffer 1 (304) comprises the part of the interaction between time 0 and time T, buffer 2 (308) comprises the part of the interaction between time T−$\Delta T$ and time 2T, and buffer 3 (312) comprises the part of the interaction between time 2T−$\Delta T$ and time 3T. Thus, each buffer (optionally excluding the first one and the last one) is of length T+$\Delta T$, and overlaps in $\Delta T$ the preceding and the following buffers.

It will be appreciated that the division into buffers takes place separately for every channel, such that buffers taken from multiple channels, are processed in parallel.

It will be appreciated that T, $\Delta T$, and the number of channels that can be processed simultaneously depends on the particular engine being used, the required accuracy, and the required notification delay. In some embodiments for some engines, between 5 and 100 channels can be processed simultaneously, with T varying between about a second and about a minute, and $\Delta T$ varying between 0.1 second and 5 seconds.

In an exemplary embodiment, 30 channels are processed simultaneously, with T=5 seconds and $\Delta T$=1 second.

Figure 4:
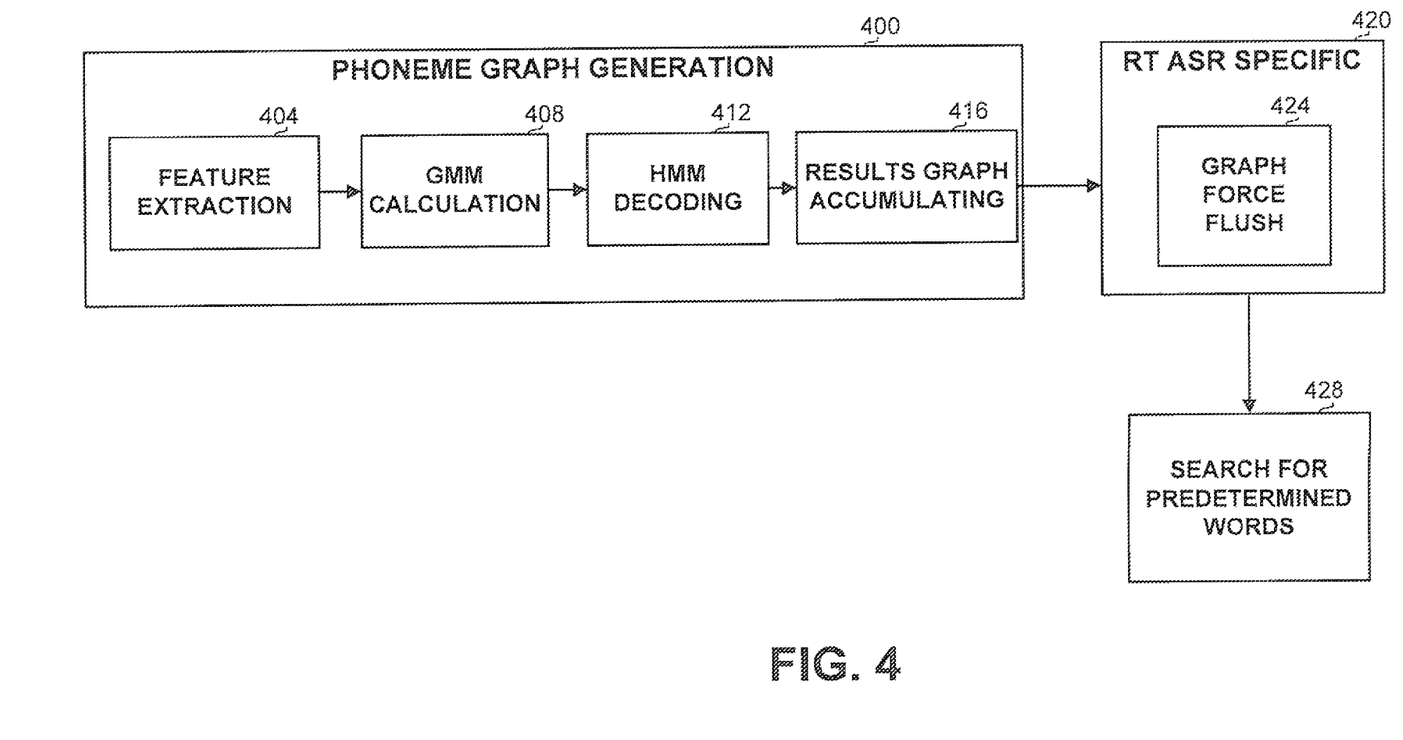
FIG. 4 is a flowchart of the main steps in a method for real-time automatic phonetic decoding, in accordance with a preferred implementation of the disclosure.

Referring now to FIG. 4, showing a flowchart of the main steps in a method for real time phoneme searching, as performed by RT phonetic search component 212 of FIG. 2. Phoneme searching may be used for word spotting, i.e., detecting the presence of words belonging to a precompiled list of words, the list containing words that may be relevant to the organization or to the problem. The words are searched within an audio stream, file or another source.

Automatic Speech Recognition (ASR) machines based on Hidden Markov Model (HMM) create a phoneme graph comprising vertices and edges, and accumulate results during their operation. Only at a later stage some edges are kept while less probable ones are removed.

In real time applications, it is required to decide before the interaction is over, for example at intervals of a number of seconds length, what the most probable "branches" or edges are. For this end, a "force-flush" of the accumulated graph is performed, which may cause removal of graph edges that have no continuity or do not lead to a final state of the HMM.

It is possible that such removal will result in loss of edges that may have later proven to be useful. Yet, the buffer overlap described in association with FIG. 3 above may compensate for such loss, as some of the data is introduced again into the IMAM decoder, allowing it to have a second chance, with different initial conditions.

Thus, the method for phoneme search in real time comprises phoneme graph generation steps 400, followed by real time specific steps 420. Real time specific steps 420 comprise graph force flush step 424 which outputs the phoneme graph generated by phoneme graph generation steps 400 for the last part of the interaction, e.g., the last 4 seconds. On step 428, the graph, which may be incomplete and different than the graph that would have been generated had the full interaction been available, is searched for words belonging to a precompiled list. The detected words are used as features output by extraction layer 200 to RT classification layer 204.

Since it is required to search the graph in real time, fast search algorithm may be used, which utilizes partial graph searching. The fast search first performs a coarse examination of selected branches of the flushed results graph. Once a "suspicious" point in the graph is found, i.e., there is a probability exceeding a threshold that the searched word is in the relevant section of the graph, a more thorough search is performed by the engine, over this section only. The thorough search comprises taking all edges of the graph which appear in a limited time range.

Thus, it will be appreciated that the fast mechanism may comprise two main options for effective search: searching along the entire time axis, but only on some edges of the graph, or searching all edges, but only on limited part of the time axis.

Figure 5A:
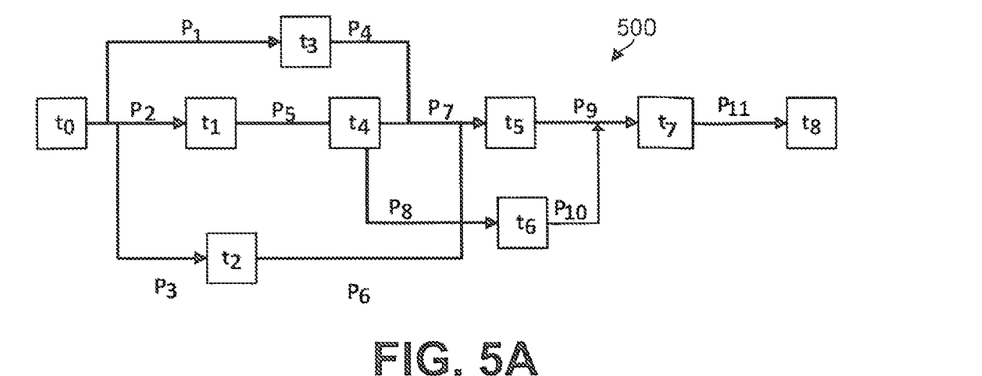
FIGS. 5A-5C are schematic illustrations of an exemplary implementation scenario of fast word search, in accordance with a preferred implementation of the disclosure.
Figure 5B:
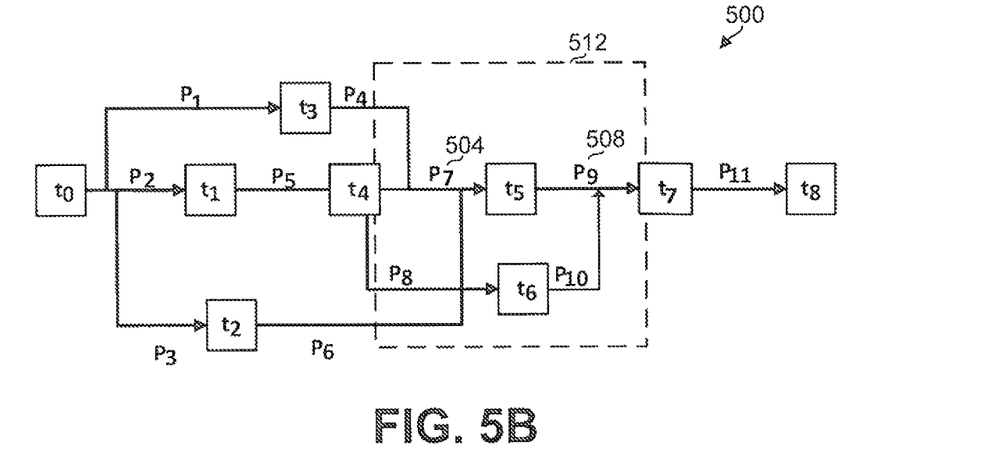
Figure 5C:
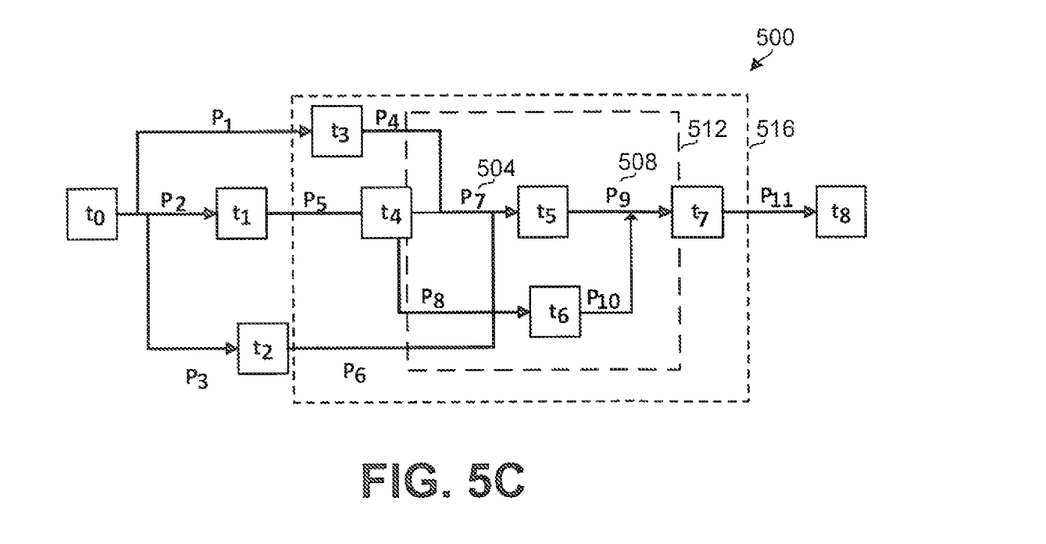

Referring now to FIGS. 5A-5C, demonstrating an exemplary implementation scenario of fast word search.

FIG. 5A shows a hypothesis graph generated by phonetic indexing. The graph may represent a part, for example a 4 second part of an audio interaction. The graph nodes, marked $t_i$ for i=0 . . . 8 represent time points, and each of the edges, marked $p_i$ for i=1 . . . 11, represents a phoneme that have possibly been said between the two time points.

In an exemplary situation, a particular partial path within the graph has the highest score, i.e., it is most probable. A coarse search is performed along the path.

Referring now to FIG. 5B. A coarse search over the most probable path identified $\{p_7, p_9\}$ phoneme sequence as resembling a phonetic string similar to the transcription of the searched word or words. Path $\{p_7, p_9\}$ is contained within time window 512.

Referring now to FIG. 5C, in which a time window 516 is indicated, which is wider than, and includes time window 512. A thorough search is performed over all edges of the partial graph contained within time window 516.

Thus, in FIG. 5B a search is performed over a partial graph which spans over the whole time represented by the full graph. In FIG. 5C, however, all edges of the graph contained within a time window which is partial to the whole graph are searched.

Referring now back to FIG. 4, in some embodiments, phoneme graph generation steps 400 can comprise a feature extraction step 404 for extracting phonetic or acoustic features from the input audio, Gaussian Mixture Model (GMM) determination step 408 for determining a model, HMM decoding step 412, and result graph accumulation step 416.

It will be appreciated that other implementations for phoneme graph generation steps 400 can be used. It will also be appreciated that steps 400 and 420 can be replaced with any other algorithm or engine that enables word spotting, or an efficient search for a particular word within the audio.

Other engines used by RT extraction layer 204 do not require significant changes due to their operation on parts of the interactions rather than the whole interactions. Thus, emotion detection component 216 can be implemented, for example, as described in U.S. patent application Ser. No. 11/568,048, filed on Mar. 14, 2007 published as US20080040110, titled "Apparatus and methods for the detection of emotions in audio interactions" incorporated herein by reference, speech to text engine 224 can use any proprietary or third party speech to text engine, CTI and CRM data extraction component 228 can obtain CTI and CRM data through any available interface, or the like.

Referring now to FIG. 6, showing a flowchart of the main steps in training any of the components of RT classification layer 204.

On training corpus receiving step 600, captured or logged interactions are received for processing. The interactions should characterize as closely as possible the interactions regularly captured at the environment. If the system is supposed to be used in multiple sites, such as multiple branches of an organization, the training corpus should represent as closely as possible all types of interactions that can be expected in all sites.

On framing step 604 an input audio of the training corpus is segmented into consecutive frames. The length of each segment is substantially the same as the length of the segments that will be fed into the runtime system, i.e., the intervals at which the system will search for the conditions for issuing a notification, thus simulating off-line the RT environment.

On feature extraction step 608, various features are extracted directly or indirectly from the input segment or from external sources. The features may include spotted words extracted by RT phonetic search component 212; emotion indications or features as extracted by RT emotion detection component 216, which provide an emotion score that represents the probability of emotion to exist within the segment; talk analysis parameters extracted by RT talk analysis component 220, such as agent/customer bursts position, number of bursts, activity statistics such as agent talk percentage, customer talk percentage, silence durations on either side, or the like; text extracted by RT speech to text engine 224 from the segment; CTI and CRM data extracted by RT CTI and CRM extraction component 228, such as number of holds, hold durations, hold position within the interaction or the segment, number of transfers, or the like. It will be appreciated that any other features that can be extracted from the audio or from an external source can be used as well. Feature extraction step 608 may also extract indirect data, such as by Natural Language Processing (NLP) analysis, in which linguistic processing is performed on text retrieved by RT speech to text engine 224 or by RT phonetic search component 212, including for example Part of Speech (POS) tagging and stemming, i.e., finding the base form of a word. NLP analysis can be performed using any proprietary, commercial, or third party tool, such as LinguistxPlatform™ manufactured by Inxight.

Further features may relate to the segment as a whole, such as segment position, in terms of absolute time within an interaction, in terms of number of tokens (segments or words) within an interaction; speaker side of the segment, for example 1 for the agent, 2 for the customer; the average duration of silence between words in the segment, or the like.

On global feature extraction step 612, interaction level features are also extracted, which may relate to the interaction as a whole, from the beginning of the interaction until the latest available frame. The features can include any of the following: average agent activity and average customer activity in percentage, as related to the whole interaction; average silence; number of bursts per participant side; total burst duration per participant side in percentage or in absolute time; emotion detection features, such as: total probability score for an emotion within the interaction, number of emotion bursts, total emotion burst duration, or the like; speech to text and NLP features such as stemmed words, stemmed keyphrases, number of word repetitions, number of keyphrases repetitions, or the like.

On feature aggregation step 616 all features obtained on feature extraction step 608, as well as the same or similar features relating to earlier segments within the interaction, and features extracted at global feature extraction step 612 are concatenated or otherwise aggregated into one feature vector. Thus the combined feature vector can include any subset of the following, and optionally additional parameters, for each segment of the interaction accumulated to that time, and to the interaction as a whole: emotion related features, such as the probability score of the segment to contain emotion and its intensity, number of emotion bursts, total emotion burst duration, or the like; speech to text features including words as spoken or their base form, wherein stop words are optionally excluded; NLP data, such as part of speech information for a word, number of repetitions of all words in the segment, term frequency-inverse document frequency (TF-IDF) of all words in the segment; talk analysis features, such as average agent activity percentage, average customer activity percentage, average silence, number of bursts per participant side, total burst duration per participant side, or the like; CTI or CRM features; or any other linguistic, acoustic or meta-data feature associated with the timeframe.

On model training step 620, a model is trained using pairs, wherein each pair relates to one segment and consists of the feature vector related to the timeframe and to the interaction as aggregated on step 616, and a manual tag assigned to the segment and received on step 624 and, which represents the assessment of a human evaluator as related to the segment and to a particular issue, such as customer satisfaction, churn probability, required sales assistance, fraud probability, or others. Training is preferably performed using methods such as Neural networks, Support Vector Machines (SVM) as described for example in "Support Vector Machines" by Marti A. Hearst, published in IEEE Intelligent Systems, vol.

13, no. 4, pp. 18-28, July/August 1998, doi:10.1109/5254.708428, incorporated herein by reference in its entirety, or other methods. The output of training step 628 is a model that will be used in production stage by the classification layer, as discussed in association with FIG. 2 above. The model predicts the existence of level of the indicated problem given a particular feature vector. It will thus be appreciated that the larger and more representative the training corpus upon which the model is evaluated, the more predictive is the trained model.

On step 628 the model is stored in any permanent storage, such as a storage device accessed by a database system, or the like.

It will be appreciated that the method of FIG. 6 can be repeated for each problem or issue handled. However, all steps of the method, excluding model training step 620 can be performed once, and their products used for training multiple models. Alternatively, only the extraction of features that are used for multiple classifications is shared, while features related to only some of the classifications are extracted when first required and then re-used when required again.

Figure 7:
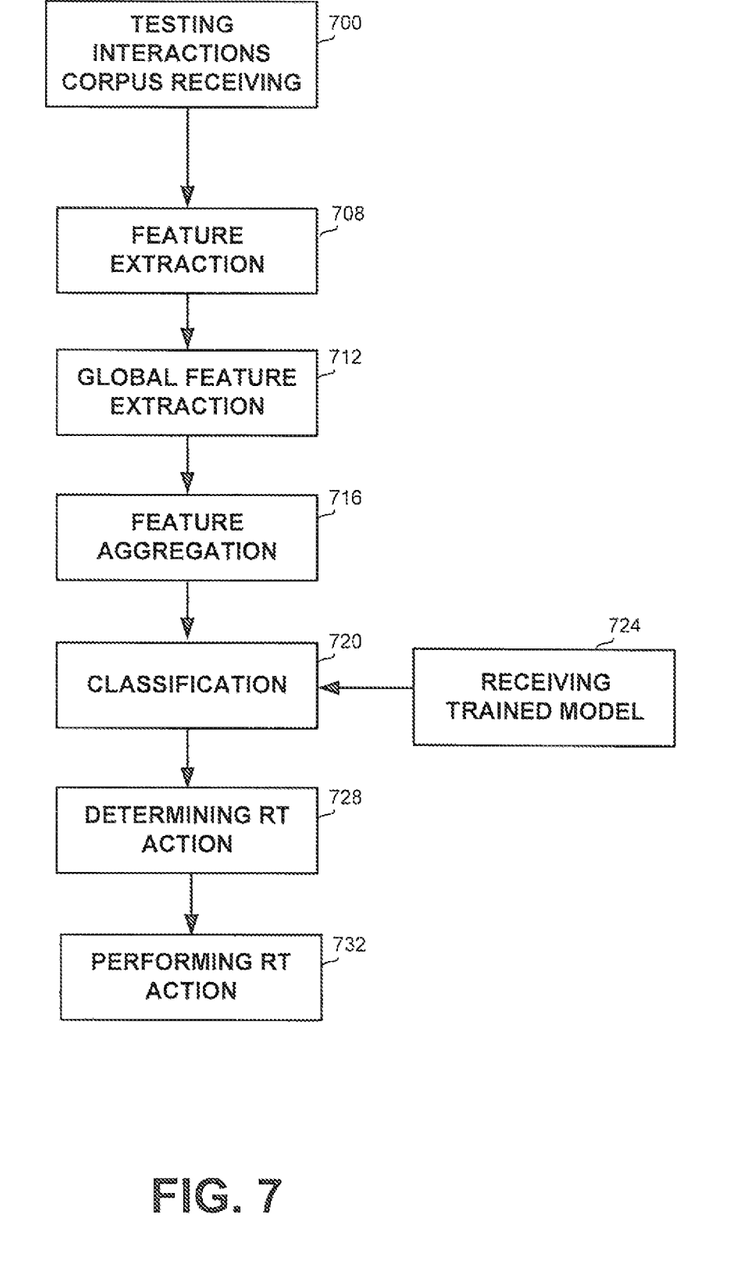
FIG. 7 is a flowchart of the main steps in a method for classifying an interaction in association with a particular problem, in accordance with a preferred implementation of the disclosure.

Referring now to FIG. 7, showing a flowchart of the main steps in classifying an interaction in association with a particular problem or issue, as performed by any of the components of RT classification layer 204 of FIG. 2.

On testing interactions receiving step 700, captured or logged interaction segments are received for processing. At least one side of the interaction is an agent, a sales person or another person associated with the organization. The other party can be a customer, a prospect customer, a supplier, another person within the organization, or the like.

The interactions are received in segments having predetermined length, such as between a fraction of a second and a few tens of seconds. In some embodiments, the interactions are received in a continuous manner such as a stream, and after a predetermined period of time, the accumulated segment is passed for further processing. As detailed in association with FIG. 3 above, the segments can overlap, and segments belonging to multiple channels can be processed by the same engines.

On feature extraction step 708, various features are extracted directly or indirectly from the input segment or from external sources, similarly to step 608 of FIG. 6. The features may include spotted words extracted by RT phonetic search component 212; emotion indications or features as extracted by RT emotion detection component 216, which provide an emotion score that represents the probability of emotion to exist within the segment; talk analysis parameters extracted by RT talk analysis component 220, such as agent/customer bursts position, number of bursts, activity statistics such as agent talk percentage, customer talk percentage, silence durations on either side, or the like; word or words extracted by RT speech to text engine 224 from the segment; CTI and CRM data extracted by RT CTI and CRM extraction component 228, such as number of holds, hold durations, hold position within the interaction or the segment, number of transfers, or the like. It will be appreciated that any other features that can be extracted from the audio or from an external source can be used as well. Feature extraction step 608 may also extract indirect data, such as by Natural Language Processing (NLP) analysis, in which linguistic processing is performed on text retrieved by RT speech to text engine 224 or by RT phonetic search component 212, including for example Part of Speech (POS) tagging and stemming, i.e., finding the base form of a word. NLP analysis can be performed using any proprietary, commercial, or third party tool, such as LinguistxPlatform™ manufactured by Inxight.

Further features can relate to the segment as a whole, such as segment position, in terms of absolute time within an interaction, in terms of number of tokens (segments or words) within an interaction; speaker side of the segment, for example 1 for the agent, 2 for the customer; the average duration of silence between words in the segment, or the like.

On global feature extraction step 712, similarly to step 612 of FIG. 6, interaction level features are extracted from the beginning of the interaction until the latest timeframe available. The features can include any of the following: average agent activity and average customer activity in percentage, as related to the whole interaction; average silence; number of bursts per participant side; total burst duration per participant side in percentage or in absolute time; emotion detection features: such as total probability score for an emotion within the interaction, number of emotion bursts, total emotion burst duration, or the like; speech to text and NLP features such as stemmed words, stemmed keyphrases, number of word repetitions, number of keyphrases repetitions, or the like.

On feature aggregation step 716, similarly to step 616 of FIG. 6, all features obtained on feature extraction step 708, as well as the same or similar features relating to earlier segments within the interaction, and features extracted at global feature extraction step 712 are concatenated or otherwise aggregated into one feature vector. Thus the combined feature vector can include any subset of the following, and optionally additional parameters, for each segment of the interaction accumulated to that time, and to the interaction as a whole: emotion related features, such as the probability score of the segment to contain emotion and its intensity, number of emotion bursts, total emotion burst duration, or the like; speech to text features including words as spoken or their base form, wherein stop words are optionally excluded; NLP data, such as part of speech information for a word, number of repetitions of all words in the segment, term frequency-inverse document frequency (TF-IDF) of all words in the segment; talk analysis features, such as average agent activity percentage, average customer activity percentage, average silence, number of bursts per participant side, total burst duration per participant side, or the like; CTI or CRM features; or any other linguistic, acoustic or meta-data feature associated with the timeframe.

On classification step 720, model 724 trained on model training step 620 of FIG. 6 in association with the relevant problem or issue, such as customer satisfaction, churn probability, required sales assistance, fraud probability, or others, is applied at the feature vector related to the segment and to the interaction as aggregated on step 716. The output of classification step 720 is an indication whether or to what degree the interaction so far is associated with the relevant problem or issue, or whether an action should be taken regarding the particular interaction, as progressed until the last segment processed.

Optionally, a confidence score is assigned to the particular segment, indicating the certainty that the relevant issue exists in the current segment.

The features used on classification step 720 may include features of the current segment, features of previous segments, and features at the interaction level. Features related to previous segments can include all or some of the features related to the current segment.

It will be appreciated that in some embodiments, feature extraction steps 708 and 712 can take place once, while feature aggregation step 616 and classification step 720 can be repeated for optionally different subsets of the extracted and aggregated features and different models such as model 724, in order to check for different problems or issues.

On RT action determination step 728, an appropriate action to be taken is determined, such as sending a notification to a supervisor, popping a message on a display device of a user; with or without a link or a connection to the interaction, routing or conferencing the interaction, initiating a call to the customer if the interaction has already ended, storing the notification, updating statistics measures, or the like.

It will be appreciated that the action to be taken may depend on any one or more of the features. For example, the action may depend on the time of the segment within the call. Upon a problem detected in the beginning of the call, an alert may be raised, but if the problem persists or worsens at later segments, a conferencing may be suggested to enable a supervisor to join the call.

Alternatively, the action may be predetermined for a certain type of problem or issue, or for all types of problems. For example, an organization may require that every problem associated with an unsuccessful sale is reported and stored, but problems relating to unsatisfied customers require immediate popup on a display device of a supervisor.

On RT action performing step 732, the action determined in step 728 is carried out, by invoking or using the relevant applications such as the applications of RT application layer 208 of FIG. 2.

The disclosed methods and system provide real time notifications or alerts regarding interactions taking place in a call center or another organization, while the interaction is still going on or a short time afterwards.

The disclosed method and system receive substantially consecutive and optionally overlapping segments of an interaction as the interaction progresses. Multiple features are extracted, which may relate to a particular segment, to preceding segments, or to the accumulated interaction as a whole.

The method and system classify the segments in association with, a particular problem or issue, and apply a trained model to the extracted features. If the classification indicates that the segment or the interaction is associated with the problem or issue, an action is taken, such as sending an alert, routing or conferencing a call, popping a message or the like. The action is taken as the interaction is still in progress, or a sort time afterwards, when the chances for improving the situation are highest.

It will be appreciated that the disclosure also relates to a computer readable storage medium containing a set of instructions for a general purpose computer, the set comprising instructions for performing the methods detailed above including: receiving a segment of an interaction in which a representative of the organization participates; extracting a feature from the segment; extracting a global feature associated with the interaction; aggregating the feature and the global feature; and classifying the segment or the interaction in association with the problem or issue by applying a model to the feature and the global feature.

It will be appreciated that multiple enhancements can be devised in accordance with the disclosure. For example, multiple different, fewer or additional features can be extracted. Different algorithms can be used for evaluating the models and applying them, and different actions can be taken upon detection of problems.

It will be appreciated by a person skilled in the art that multiple variations and options can be designed along the guidelines of the disclosed methods and system.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step or component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized method for indicating in real time that an interaction in which a representative of an organization participates is associated with a problem or issue, comprising:
 capturing the interaction in a storage device by a computing platform comprising a processing apparatus, the interaction comprises at least a speech;
 receiving a segment of the captured interaction;
 extracting a feature from the segment wherein the feature is a word spoken in the segment of the interaction obtained by a speech to text mechanism comprising hardware;
 extracting a global feature associated with the whole interaction in progress;
 extracting features from segments of the interaction that are earlier to the segment;
 aggregating the feature and the global feature and features similar to the feature that are related to the segments;
 classifying the segment of the interaction in association with the problem or issue by applying a model to the feature and the global feature and the features similar to the feature that are related to the segments,
 wherein extracting the feature from the segment comprises:
  generating a phoneme graph from the segment of the interaction;
  flushing a part of the graph by removing graph edges that have no continuity or do not lead to a final state of a HMM, wherein the edges represent candidate phonemes between two time points;
  coarsely examining the flushed graph and determining a point in the flushed graph of high probability, wherein the point comprises a most probable sub-path of a path;
  determining a limited time segment window based on the most probable sub-path that covers the sub-paths above or below the most probable sub-path; and
  performing a thorough search only over the limited time segment window, wherein the thorough search comprises all edges which appear in the limited time window,
  determining one or more words based on the thorough search,
 wherein the recited operations are carried out in real time by a computing platform executing one or more computer applications.

2. The method of claim 1 further comprising determining an action to be taken when the classification indicated that the segment of the interaction is associated with the problem or issue.

3. The method of claim 1 further comprising,:
 receiving a training corpus;
 framing, an interaction of the test corpus into segments;
 extracting features from the segments; and
 evaluating, the model based on the features.

4. The method of claim 1 wherein the feature relates to the segment and is selected from the group consisting of: a spotted word; a feature or indication associated with emotion; an emotion score that represents the probability of emotion to exist within the segment; a talk analysis parameters; an agent burst position; a customer burst position; a number of bursts;

agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment.

5. The method of claim 1 wherein the global feature is selected from the group consisting of: average agent activity within the interaction; average customer activity within the interaction; average silence; number of bursts per participant side; total burst duration per participant side; an emotion detection feature; total probability score for an emotion within the interaction; number of emotion bursts; total emotion burst duration; a stemmed word, a stemmed keyphrase; number of word repetitions; and number of keyphrase repetitions.

6. The method of claim wherein the aggregation step aggregates a feature related to a second segment preceding the segment, the feature selected, from the group consisting of: a spotted word; a feature or indication associated with emotion; an emotion score that represents the probability of emotion to exist within the segment; a talk analysis parameters; an agent burst position; a customer burst position; a number of bursts; agent talk percentage; customer talk percentage; a silence duration; a word extracted by a speech to text engine; number of holds; hold duration; hold position; number of transfers; part of speech tagging or stemming; segment position within the interaction in absolute time, segment position within the interaction in number of words; speaker side within the segment; and average duration of silence between words in the segment.

7. The method of claim 2 wherein the action is selected from the group consisting of: popping a message on a display device used by a person; generating an alert; muting the interaction; conferencing the interaction; and adding data to a statistical storage.

8. The method of claim 1 wherein the problem or issues is selected from the group consisting of: customer dissatisfaction; churn prediction, sales assistance; and fraud detection.

9. The method of claim wherein the segment of the interaction overlaps with a previous or following segment of the interaction.

* * * * *